Figure 1:
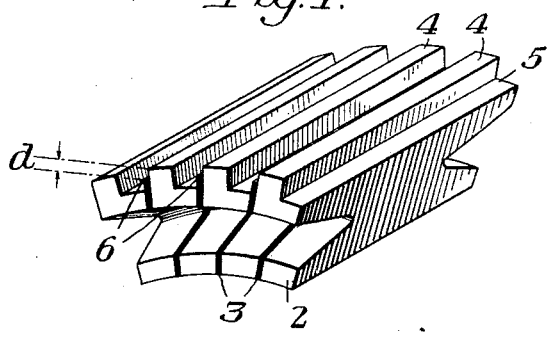

May 14, 1929.  E. B. PHILLIPS  1,713,089
ELECTRICAL MACHINE
Filed Jan. 3, 1927  2 Sheets-Sheet 1

INVENTOR
Emory B. Phillips
by his atty.
Byrnes, Stebbins & Parmelee

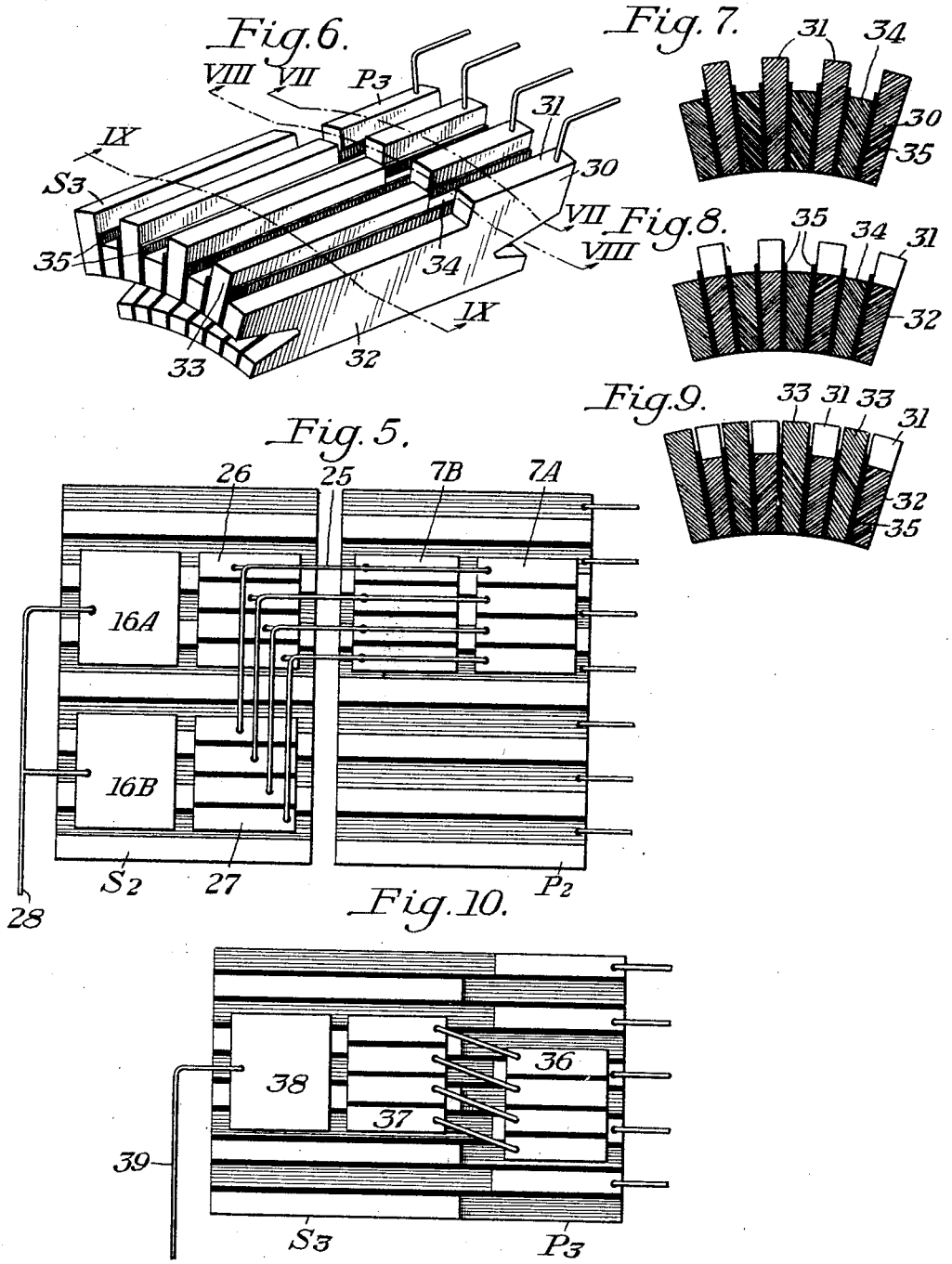

Patented May 14, 1929.

1,713,089

UNITED STATES PATENT OFFICE.

EMORY B. PHILLIPS, OF PITTSBURGH, PENNSYLVANIA.

ELECTRICAL MACHINE.

Application filed January 3, 1927. Serial No. 158,544.

This invention relates to electrical machines, and particularly to commutating means therefor. It is equally applicable to motors, generators and converters.

Commutators as heretofore constructed have comprised copper segments separated from one another by thin sheets of mica. The peripheral surface of the commutators has generally comprised a true cylindrical surface, although in a few cases the mica has been terminated a short distance below the peripheral surface.

It has been considered essential in high voltage machines to employ armatures of relatively large diameter in order to overcome the difficulties inherent to commutators of the present type. With a large diameter machine more coils and corresponding segments may be employed, thus reducing the difference in voltage between adjacent segments.

The difficulty with large diameter machines is that they are relatively heavier per unit of capacity than small diameter machines, are more expensive to build, and require a considerably larger amount of copper in the end portions of the coils, which portions have no function except to connect the active portions of the coils, and simply constitute a necessary expense in construction.

In addition to the above difficulties, a large diameter machine requires a greater core depth in the armature in order to properly carry the magnetic flux over the relatively greater distance between the field poles.

During commutation a brush spanning adjacent segments is functioning to temporarily short circuit the coil over the period during which the segments on the particular coil are in contact with the brush and cause a reversal of the direction in which current flows in the coil. This is true whether the machine is a motor in which current is supplied to the coil, or in the case of a generator in which current is generated in the coil.

It is desirable that the value of the current through the coil over the period of commutation shall change in a substantially straight line relation with time during the period of commutation from maximum coil current flowing in one direction to maximum coil current flowing in the other direction. The self-induction of the coil itself tends to defeat this object, and commutating poles and compensating windings have been employed to remedy the situation. Commutating poles, however, are limited in their effectiveness because of the fact that their cores become magnetically saturated and the effect of the commutating pole is strictly limited by this factor. While compensating windings may be somewhat helpful in partially preventing such core saturation, they are not a cure for the condition.

During commutation a voltage difference is set up between the segments of a coil which is being commutated. This voltage difference represents the difference in magnitude of the reactance voltage in the coil and the voltage induced by the commutating pole flux. This last is commonly known as the commutating voltage. There is a flow of current from one segment through the brush and thence to the other segment due to this unbalanced voltage. This current flow is principally limited by the contact resistance between the brush and the segments. As a segment passes out from under the brush the area of contact between the brush and that particular segment becomes less and less, and the contact resistance between the brush and this particular segment therefore increases.

As the adjacent segment comes into engagement with the brush, the area of contact between the brush and such segment increases between the brush and this particular segment. It is this continuous change in area of contact as the segments move over the brush which gives a choke effect and causes the proper division of flow of the main armature current through the segments in contact with the brush, and if no other mitigating causes are present, causes the current change in the coil to be at a uniform rate.

Brushes are generally made of carbon because of its desirable electrical properties. The value of the contact resistance is limited and this brings us back to the original statement that the voltage difference between the reactance voltage and the commutating voltage in the coil being commutated must be held to a low figure if heating and flashing are to be avoided.

I provide at least three brushes connected in series and forming a part of the electrical path for the short circuit current of the armature coil, thus naturally increasing the contact resistance. I employ a commutator whose segments are connected to the armature coils, and a second commutator whose segments are insulated from the first commutator and whose segments are not connected to the armature coils.

Brush members are employed in connection with both commutators. These brush members are so arranged and connected that the short circuit current passes from a segment in the first commutator through a brush connection to a segment of the second commutator, thence through another brush member to another segment of the second commutator, and thence through a brush connection to a segment of the first commutator, completing the path for the short circuit current.

In order to prevent current from passing directly from a segment of the first commutator through the cooperating brush to a second segment of the same commutator, I make the brush in several portions insulated from one another. The segments are cut away in part so that the peripheral contacting surface of each segment is narrower than the segment proper. The space between the contacting surfaces of adjacent segments is made greater than the width of the brush portions.

This commutator arrangement is of value because it permits of better insulation between segments, as will be hereinafter pointed out. It also is effective for breaking up the ionized layer of gases which is set up on commutators of the ordinary type. The presence of the layer of ionized gases on the peripheral surface of a commutator is responsible to a large degree for flashing trouble, and this is eliminated with my construction.

A commutator of this character will not heat up as rapidly as a commutator of the ordinary type, because cooling is assisted by the windage effect occasioned by the interrupted periphery, and also by the materially increased radiation surface. This construction also permits of terminating the mica between segments at a distance below the peripheral surface greater than the total permissible wear on the commutator, thus doing away with all "high mica" troubles.

With my construction a much better choke effect at the commutator is obtained. A higher reactance voltage in the coils and a correspondingly higher commutating voltage is permissible. It is therefore possible to use armature coils having a longer active portion. I am thus enabled to make high voltage machines with smaller diameter and longer armatures, with a material saving in copper and other materials, as well as improving the efficiency of the machine.

In the accompanying drawings which illustrate more or less diagrammatically the present preferred embodiment of my invention and certain modifications thereof.

Figure 1 is a perspective view of a portion of a commutator.

Figure 2:
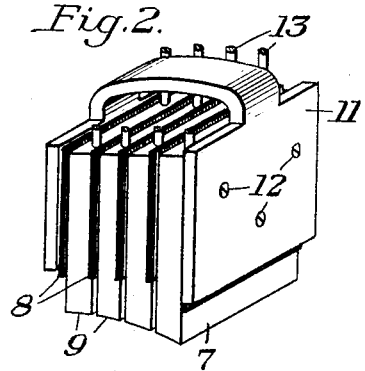
Figure 3:
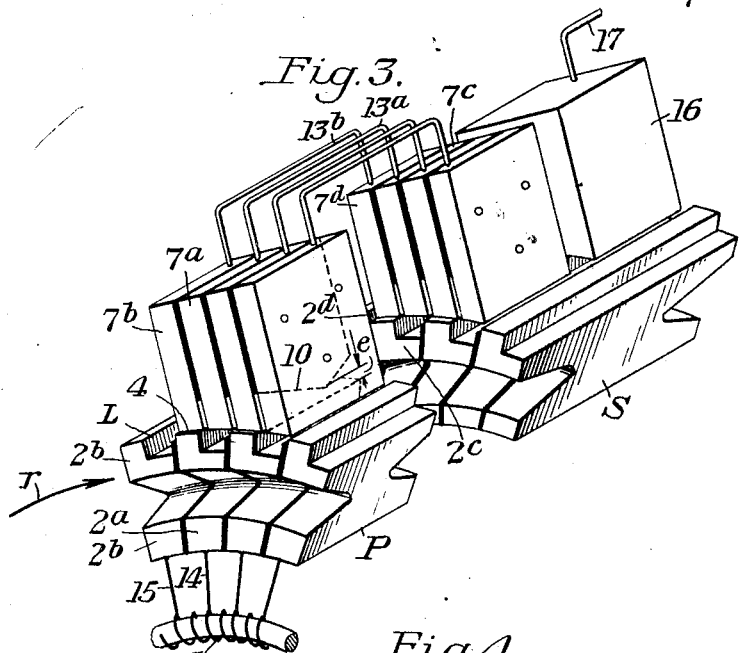
Figure 4:
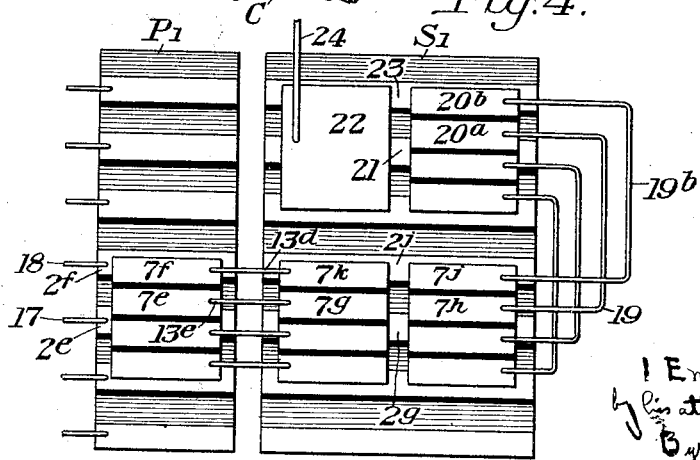

Figure 2 is a perspective view of a brush member adapted to cooperate with the commutator of Figure 1, Figure 3 is a perspective view showing the arrangement of two commutators with the several brushes in engagement therewith, Figure 4 is a diagrammatic view illustrating a modification wherein additional brushes are employed in series, Figure 5 is a diagrammatic view showing my invention applied to commutators wherein brushes are employed in parallel, Figure 6 is a perspective view of a modified commutator construction, Figure 7 is a section taken on the line VII—VII of Figure 6, Figure 8 is a section taken on the line VIII—VIII of Figure 6, Figure 9 is a section taken on the line IX—IX of Figure 6, and Figure 10 is a diagrammatic view showing the arrangement of brushes with the commutator of Figure 6.

Referring first to Figures 1 to 3 inclusive, there is shown a commutator made of segments 2 separated by mica insulators 3. The outer face of each segment is cut away so as to leave a relatively narrow brush contacting surface 4 and recessed portions 5.

The insulating portions 3 are terminated a distance below the brush contacting surface 4, as indicated at 6. The distance $d$ is made greater than the permissible wear on the commutator. It will be noted from Figure 1 that the insulating portions project above the recessed portions 5 as this materially improves the insulation between segments. All parts of the commutators except the brush contacting surface 4 are covered with a suitable non-conducting enamel. Two commutators of the type illustrated in Figure 1 are employed. One of them, termed the primary commutator, is indicated at P in Figure 3, and the second one, termed the secondary commutator, is indicated at S in the same drawing.

The brush is made of portions 7 separated by mica insulating plates 8. The insulating plates 8 project a slight distance beyond the sides and top surfaces of the brush members 7, as shown in Figure 2. The edges of the insulating plates adjacent the contact surface 9 are not made parallel to the line of contact of the brush with the commutator, but at an angle thereto, as indicated at 10 in Figure 3. This arrangement insures a better air draft and thus prevents the accumulation of carbon dust or the like between adjacent brush portions 7. The insulating plates 8 are terminated a short distance $e$ from the contacting surface 9, which distance is greater than the total permissible wear on the brush.

The brush portions 7 are held in a brush frame 11 by rivets or screws 12. The brush portions 7 are insulated from the brush frame 11 and the screws 12. Each brush portion 7 is provided with a conductor 13. The brush frame 11 is made wider than the brushes, thus preventing contact between the brush member 7 and the brush box which holds the assembled brush in place. The fact that the brush frame is insulated from the brush members materially simplifies the construction, as it does away with any necessity for specially insulating the brush box, or constructing it of non-insulating materials. On the contrary, the brush box may be made of metal with the assurance that the brush will fit closely in the box and at the same time always be slidable therein.

It will be noted from Figure 3 that the brush portions 7 are of such width that any one brush portion can never be in contact with two commutator segments at the same time.

The direction of rotation of the armature is indicated by an arrow $r$ in Figure 3. An armature coil C will be considered to show the operation.

The coil C is provided with leads 14 and 15 terminating in segments $2^a$ and $2^b$, respectively, of the primary commutator P. At the time that substantially the entire contacting surface 4 of the segment $2^a$ lies under the brush member $7^a$, the leading edge L of the segment $2^b$ comes into contact with the brush member $7^b$.

The path of the short circuit current is from the coil C through the lead 14, to the segment $2^a$ and thence to the brush member $7^a$. A conductor $13^a$ leads the current from the brush member $7^a$ to a corresponding brush member $7^c$, cooperating with the secondary commutator S. The secondary commutator has a segment $2^c$ so arranged that it engages and leaves the brush $7^c$ at the same time that segment $2^a$ engages and leaves the brush $7^a$. The short circuit current flows through the brush $7^c$ to the segment $2^c$ and then lengthwise of the segment to a brush member 16. This brush member spans several segments of the secondary commutator and is provided with a conductor 17 through which the main armature current flows. The short circuit current is enabled to reach a segment $2^d$ through the brush member 16. The segment $2^d$ is arranged to engage and leave a brush member $7^d$ at the same instant that the segment $2^b$ engages and leaves the brush member $7^b$. The brush members $7^b$ and $7^d$ are connected by a conductor $13^b$. The short circuit current thus flows from the segment $2^c$ through the brush 16 to the segment $2^d$, thence through the brush member $7^d$, the conductor $13^b$, the brush member $7^b$ and the segment $2^b$ to the lead 15.

As above stated, the value of the contact resistance is relatively small and cannot be increased in ordinary construction. It will be seen, however, that with my construction there is a contact resistance between the segment $2^a$ and the brush portion $7^a$; another contact resistance between the brush portion $7^c$ and the segment $2^c$; another between the segment $2^c$ and the brush 16; another between the brush 16 and the segment $2^d$; another between the segment $2^d$ and the brush portion $7^d$ and another between the brush portion $7^b$ and the segment $2^b$. Instead of having two contact resistances, as is the case in the ordinary commutator, there are six contact resistances, and since these are in series the resistance to current flow through the brush system from the segment $2^a$ to the segment $2^b$ is increased threefold. This permits of a material increase in the reactance voltage and the commutating voltage, despite the fact that as the value of these two increases, there is a greater voltage difference between segments. The shape of the segments themselves prevents the current jumping over the insulation between segments.

Figure 4 shows a construction wherein a larger number of brushes is employed. The primary and secondary commutators are indicated at $P_1$ and $S_1$.

The operation of this form of the invention will be shown in connection with the commutation of a coil whose leads are indicated at 17 and 18. The lead 17 terminates in a segment $2^e$, and the lead 18 terminates in a segment $2^f$. During commutation the short circuit current flows from the segment $2^e$ to a brush member $7^e$, thence through a conductor $13^c$ to a brush member $7^g$ on the secondary commutator $S_1$. Current flows from the brush member $7^g$ to a segment $2^g$ on the secondary commutator and thence to a brush member $7^h$.

From the brush member $7^h$ the short circuit flows through a conductor 19 to a brush member $20^a$, engaging a segment 21 on the secondary commutator. A brush 22 spans the segment 21 and an adjacent segment 23. The main armature current flows through a conductor 24 connected to the brush 22. The short circuit current flows from the brush 22 to the segment 23 and thence to a segment $20^b$ from a part of the same brush construction as does the segment $20^a$. The short circuit current travels from the brush $20^b$ through a conductor $19^b$ to a brush member $7^j$, thence through a segment $2^j$ on the secondary commutator to a brush member $7^k$. From the brush member $7^k$ it flows through a conductor $13^d$ to a brush member $7^f$, and thence through the segment $2^f$ of the primary commutator to the lead 18.

The several brushes are so arranged that the brush portions $7^e$, $7^g$, $7^h$ and $20^a$ make contact at substantially the same instant with corresponding commutator segments. The parts are also so arranged that brush members $7^f$, $7^k$, $7^j$, $20^b$ and 22 make substantially simultaneous contact with corresponding segments.

It was pointed out in connection with the apparatus of Figure 3 that the resistance to flow of the short circuit current might be increased to three times the value obtainable with ordinary commutators. It will be seen that with the above described arrangement of Figure 4, the resistance to flow of the short circuit current can be increased to five times the ordinary figure.

Figure 5 shows a structure operating on the same principle as the apparatus of Figure 3, but the brushes are in a series-parallel arrangement as is done in high current capacity machines. On the primary commutator $P_2$ I provide two composite brush structures $7^A$ and $7^B$, whose corresponding brush portions are connected by conductors 25. These conductors lead to composite brush members 26 and 27 on the secondary commutator $S_2$. Brush members $16^A$ and $16^B$ are located alongside the composite brush members 26 and 27. The main armature current flows through a conductor 28. The brushes $7^A$, $7^B$, 26, $16^A$, 27 and $16^B$ are all so arranged that they are engaged by commutator segments at substantially the same instant.

Figures 6 to 10 inclusive illustrate another form of the invention which is particularly useful if the current capacity is such that an unduly long commutator is not required. In this form of the invention the segments of the primary commutator $P_3$ and of the secondary commutator $S_3$ are staggered one with respect to the other. Instead of recessing the commutator segments, as is done in the embodiments of the invention heretofore described, the segments of each commutator are made only of the width desired for the brush contacting surface and the necessary spacing is secured by extending the segments of one commutator substantially the length of the other commutator. This is clearly shown in Figure 6, where a segment 30 of the primary commutator has a portion 31 of full height to make contact with the brushes, and a portion 32 of reduced height which extends between the segments of the secondary commutator $S_3$. Similarly each segment of the secondary commutator $S_3$ has a portion 33 of full height so as to make contact with the brushes, and a portion 34 of reduced height which extends between the portions 31 of the primary commutator $P_3$. Mica strips 35 extend the full length of both commutators so as to provide the necessary insulation. With this construction the entire commutator assembly may be clamped with only two V rings, whereas in the embodiments of Figures 1 to 5 inclusive, both the primary and secondary commutators require two V rings.

The relative size and position of the several parts in the commutator of Figure 6 is best shown in Figures 7 to 9 inclusive.

Figure 10 illustrates diagrammatically the arrangement of brushes with the commutator of Figure 6. A composite brush 36 makes contact with the primary commutator $P_3$, and a corresponding brush 37 is employed in connection with the secondary commutator $S_3$. A brush 38, having a conductor 39 for the main armature current, is placed alongside the brush member 37. It will be noted that the brush 36 is placed out of line with the brushes 37 and 38. The offsetting is in such amount that a segment of the commutator $P_3$ will make contact with the brush member 36 at the same instant that a segment on the commutator $S_3$ makes contact with the brush members 37 and 38.

I have illustrated and described a preferred embodiment of the invention, and certain modifications thereof, but it will be understood that it is not limited to this form alone, as it may be otherwise embodied within the scope of the following claims.

I claim:—

1. In an electrical machine, a commutator, a coil and at least three brushes connected in series and forming a part of the electrical path for the short circuit current of said coil, the series connection being at least in part through the commutator.

2. In an electrical machine, a commutator, a coil and at least three brushes connected in series and forming a part of the electrical path for the short circuit current of said coil, the series connection being at least in part through the commutator, there being an odd number of brushes.

3. In an electrical machine, an armature coil, a commutator having a segment connected to the armature coil, a brush cooperating with the commutator, a second commutator, and a brush for the second commutator connected to the first brush, the commutators and brushes and their connection forming a part of the electrical path for the short circuit current of the armature coil.

4. In an electrical machine, an armature coil, a commutator having a segment connected to the armature coil, a brush cooperating with the commutator, a second commutator, a brush for the second commutator connected to the first brush and means including a conductor for the main armature current for connecting the armature coil to said conductor through said commutators and brushes in series.

5. In an electrical machine, a coil and a plurality of commutators having brushes, the commutators and brushes being arranged in series relation in the path through which the short circuit current of the coil flows.

6. In an electrical machine, a commutator having segments, a plurality of primary brush portions for the commutator engaging different segments thereof, a second commutator, a plurality of secondary brush portions for the second commutator engaging different segments thereof, connections between the brush portions of the two commutators and a brush member connecting those segments of the second commutator which are engaged by the secondary brush portions.

7. In an electrical machine, a commutator having segments, a plurality of primary brush portions for the commutator engaging different segments thereof, a second commutator, a plurality of secondary brush portions for the second commutator engaging different segments thereof, connections between the brush portions of the two commutators and a brush member connecting those segments of the second commutator which are engaged by the secondary brush portions, the primary and secondary brush portions being so related as to make contact with corresponding segments on the first and second commutators at substantially the same instant.

8. In an electrical machine, a commutator having segments, a plurality of primary brush portions for the commutator engaging different segments thereof, a second commutator, a plurality of secondary brush portions for the second commutator engaging different segments thereof, connections between the brush portions of the two commutators and a brush member connecting those segments of the second commutator which are engaged by the secondary brush portions, the primary and secondary brush portions and the brush member being so related as to make substantially simultaneous contact with corresponding segments on their respective commutators.

9. In an electrical machine, a coil and a plurality of commutators having brushes, the commutators and brushes being arranged in series relation with the coil, the brushes for the several commutators being so related as to make contact with corresponding segments on their respective commutators at substantially the same instant.

10. In an electrical machine, an armature having coils, a commutator connected to the coils, a second commutator isolated from the coils, brush connections adapted to connect segments of the first commutator with segments of the second commutator and brush means for connecting such segments of the second commutator.

11. In an electrical machine, an armature having coils, a commutator connected to the coils, a plurality of brush means arranged to substantially simultaneously engage the same segments of the commutator, a second commutator isolated from the coils, a plurality of brush members connected to the first mentioned brush members and adapted to cooperate therewith to connect segments of the first commutator with segments of the second commutator, and brush means for connecting such segments of the second commutator.

12. In an electrical machine, an armature having coils, a commutator connected to the coils, a plurality of brushes adapted to substantially simultaneously engage the same segment of the commutator, each brush member being made of a plurality of brush portions insulated from one another and adapted to engage different segments of the commutator, a second commutator isolated from the coils, a plurality of brush portions connected to the several brush portions of the first mentioned commutator and adapted to thus connect segments of the first commutator with segments of the second commutator and brush means for connecting such segments of the second commutator.

13. In an electrical machine, an armature having coils, a commutator connected to the coils, a brush portion adapted to make contact with a segment of the commutator, a second commutator isolated from the coils, a plurality of brush portions adapted to engage different segments of the second commutator and thus connect a segment of the first commutator with such segments of the second commutator, a second brush portion for the first commutator adapted to engage a different segment thereof, a plurality of brush portions connected to the second brush portion of the first commutator and adapted to engage segments of the second commutator different from those engaged by those brush portions which are connected to the first mentioned brush portion of the first commutator, and brush means adapted to connect segments of the second commutator so as to form an electrical path from one of the brush portions for the first mentioned commutator through the brush portions of the second commutator back to the second mentioned brush portion for the first commutator.

In testimony whereof I have hereunto set my hand.

EMORY B. PHILLIPS.